(12) United States Patent
Dong

(10) Patent No.: US 11,290,626 B2
(45) Date of Patent: Mar. 29, 2022

(54) SWIVELLING MODULE, IMAGING DEVICE, AND ELECTRONIC DEVICE

(71) Applicant: TRIPLE WIN TECHNOLOGY (SHENZHEN) CO. LTD., Shenzhen (CN)

(72) Inventor: Zhi-Gao Dong, Shenzhen (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 16/985,556

(22) Filed: Aug. 5, 2020

(65) Prior Publication Data

US 2021/0392247 A1    Dec. 16, 2021

(30) Foreign Application Priority Data

Jun. 15, 2020 (CN) .......................... 202021100962.1

(51) Int. Cl.
  *H04N 5/225* (2006.01)
(52) U.S. Cl.
  CPC ......... *H04N 5/2254* (2013.01); *H04N 5/2257* (2013.01)
(58) Field of Classification Search
  CPC ..... H04N 5/2254; H04N 5/2257; G03B 27/56
  See application file for complete search history.

(56) References Cited

U.S. PATENT DOCUMENTS

| | | | | |
|---|---|---|---|---|
| 7,388,700 | B1* | 6/2008 | Odhner | G02B 7/1821 359/224.1 |
| 2008/0266404 | A1* | 10/2008 | Sato | G02B 7/021 348/208.5 |
| 2012/0320596 | A1* | 12/2012 | Hastings | F16M 11/125 362/259 |
| 2014/0327818 | A1* | 11/2014 | Huang | H04N 5/2254 348/376 |
| 2015/0077623 | A1* | 3/2015 | Lo | G03B 17/17 348/369 |
| 2017/0371230 | A1* | 12/2017 | Ko | G03B 17/17 |

* cited by examiner

*Primary Examiner* — Abdelaaziz Tissire
(74) *Attorney, Agent, or Firm* — ScienBiziP, P.C.

(57) ABSTRACT

A swivelling module able to capture light from any desired direction includes a light-transmitting housing, a reflecting element in the light-transmitting housing, a plurality of magnets disposed on a periphery of the reflecting element, and a plurality of electromagnetic induction coils disposed on corners of the light-transmitting housing. When the electromagnetic induction coils are energized, the electromagnetic induction coils interact with the magnets to drive the reflecting element to rotate to a desired direction. An imaging device and an electronic device including the swivelling module are also disclosed.

12 Claims, 4 Drawing Sheets

SWIVELLING MODULE, IMAGING DEVICE, AND ELECTRONIC DEVICE

FIELD

The subject matter herein generally relates to optical devices, and more particularly to a swivelling module, an imaging device including the swivelling module, and an electronic device including the swivelling module.

BACKGROUND

An electronic device, such as a tablet computer or a cellphone, usually includes a front-facing camera for self-photography and a rear-facing camera for photographing other people. However, the front-facing camera and the rear-facing camera take up much interior space of the electronic device and the front-facing camera usually has a low resolution.

BRIEF DESCRIPTION OF THE DRAWINGS

Implementations of the present technology will now be described, by way of embodiment, with reference to the attached figures.

DETAILED DESCRIPTION

Figure 1:
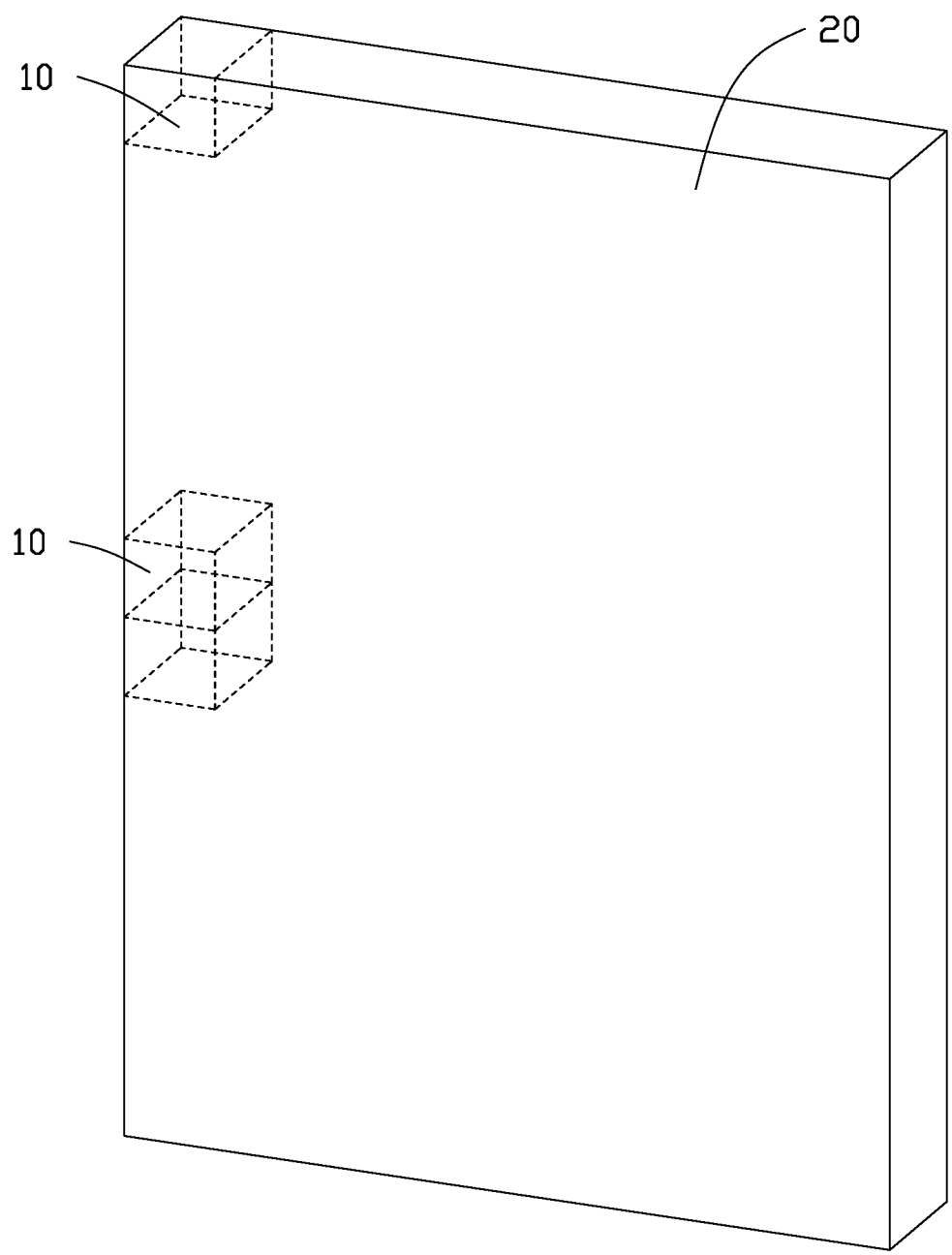
FIG. 1 is a schematic view of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

FIG. 1 illustrates an embodiment of an electronic device 100. The electronic device 100 can be any electronic device having imaging capturing functions, such as vehicle-mounted recorders, smart phones, tablet computers, notebook computers, e-book readers, portable multimedia players (PMP), mobile phones, video phones, digital still cameras, mobile medical devices, or wearable devices.

The electronic device 100 includes an imaging device 10 and a main body 20. The imaging device 10 is arranged on the main body 20. The imaging device 10 may include, but is not limited to, a camera. In some embodiments, the imaging device 10 is disposed at a corner of the electronic device 100, such that the imaging device 10 can capture images in four directions. In some embodiments, the imaging device 10 is disposed at a side edge of the electronic device 100, such that the imaging device 10 can obtain images captured from three directions.

Figure 2:
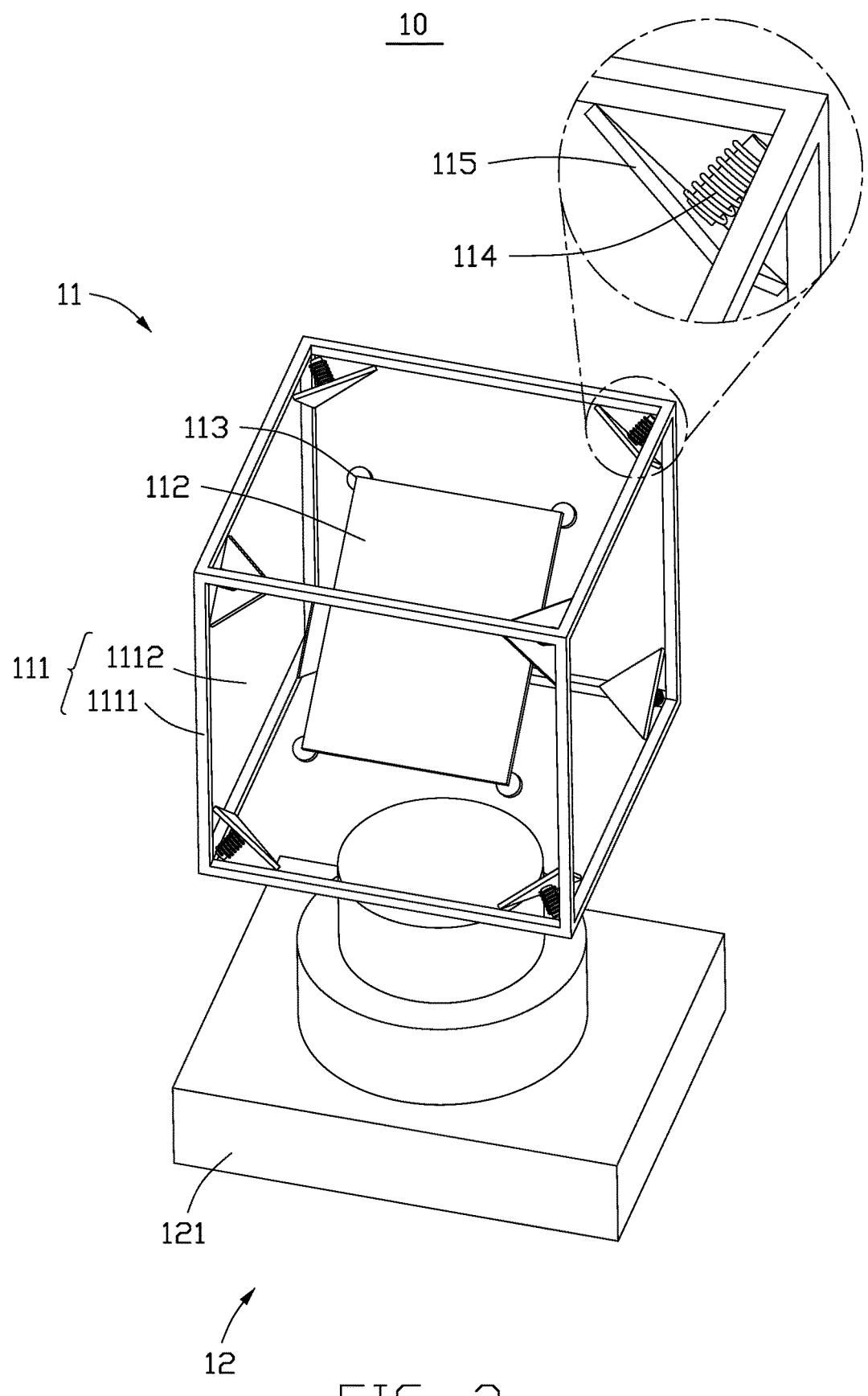
FIG. 2 is a schematic view of an embodiment of an imaging device.

FIG. 2 illustrates that the imaging device 10 includes at least one swivelling module 11 and a lens module 12.

The swivelling module 11 includes a light-transmitting housing 111, a reflecting element 112, a plurality of magnets 113, and a plurality of electromagnetic induction coils 114.

The reflecting element 112 is rotatably disposed inside the light-transmitting housing 111 and configured to reflect light entering the light-transmitting housing 111. The magnets 113 are arranged on a periphery of the reflecting element 112. The electromagnetic induction coils 114 are located at corners of the light-transmitting housing 111. When the electromagnetic induction coils 114 are energized, the electromagnetic induction coils 114 interact with the magnets 113 enabling rotation of the reflecting element 112. The reflecting element 112 reflects light from a predetermined direction to the lens module 12.

The light-transmitting housing 111 includes a frame 1111 and a plurality of transparent plates 1112.

The frame 1111 is substantially the outline of a cube. The reflecting element 112 is rotatably arranged in the frame 1111.

The transparent plates 1112 are arranged on lateral surfaces of the frame 1111. In the embodiment, the transparent plates 1112 are glass plates.

The reflecting element 112 is substantially rectangular. In one embodiment, the reflecting element 112 is made of metal, such as aluminum or aluminum alloy. In this case, the reflecting element 112 has two opposite fully reflecting surfaces.

In some embodiments, the reflecting element 112 is made of glass. In this case, the reflecting element 112 has one fully reflecting surface.

A center of the reflecting element 112 coincides with a geometric center of the light-transmitting housing 111, and the reflecting element 112 can be rotated around the center to a preset angle under an action of magnetic forces, where the preset angle is in a range from 0° to 360°.

Since identical polarities repel while opposite polarities attract, different currents may be applied to the electromagnetic induction coils 114 to drive the reflecting element 112 to rotate 0°~360° around its center.

In the embodiment, there are four magnets 113, and the four magnets 113 are disposed on four corners of the periphery of the reflecting element 112. There are eight electromagnetic induction coils 114, and the eight electromagnetic induction coils 114 are disposed on eight corners of the light-transmitting housing 111.

In some embodiments, the swivelling module 11 further includes a plurality of cover plates 115.

The cover plates 115 are substantially triangular, and correspond one-to-one to the electromagnetic induction coils 114. The cover plates 115 are configured to fix the electromagnetic induction coils 114 at the corners of the light-transmitting housing 111.

The lens module 12 includes a camera module 121. The camera module 121 is arranged on a side of the swivelling module 11 and configured to receive light from the swivelling module 11 to obtain a high-resolution image of an object.

Figure 3:
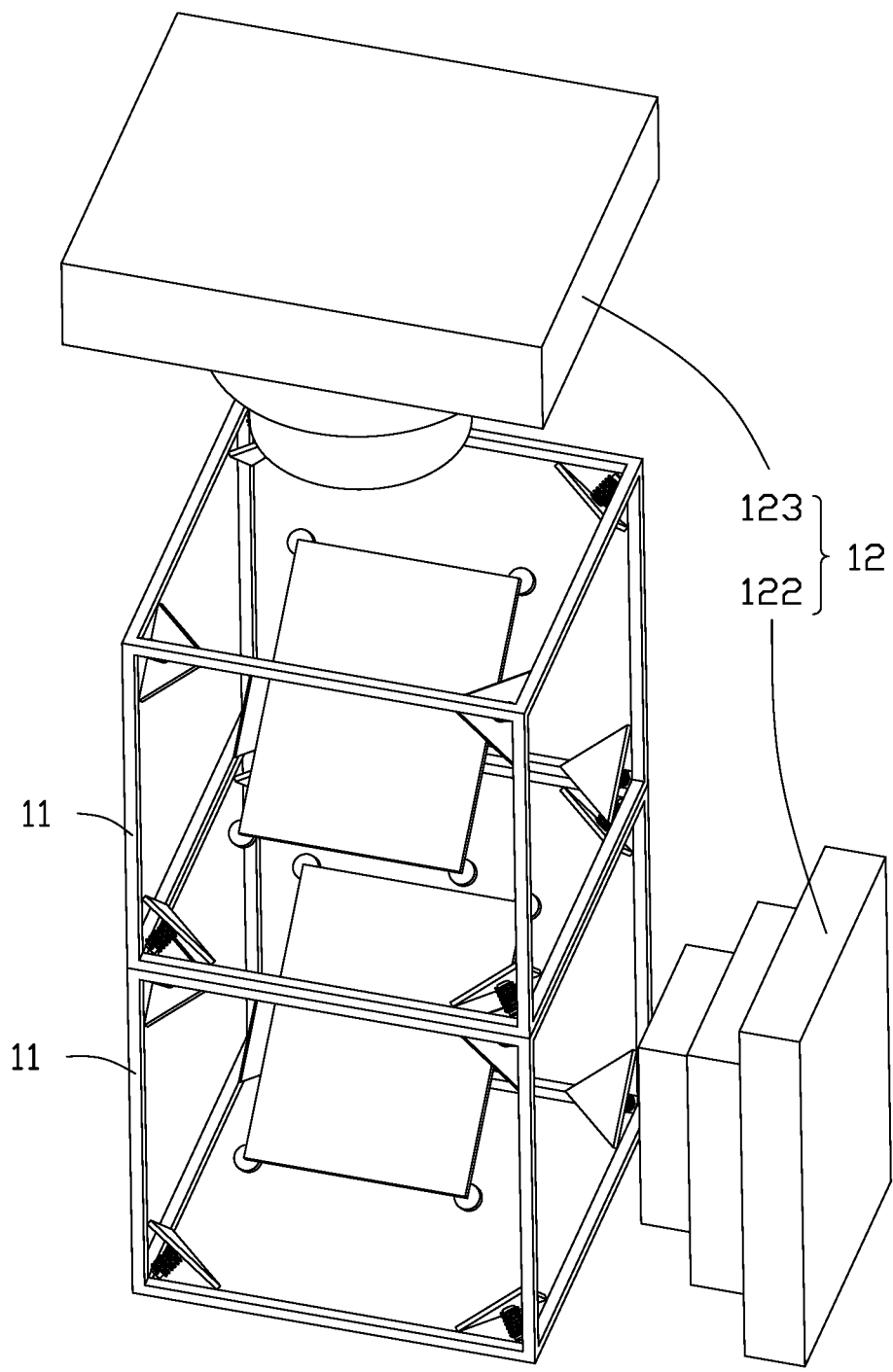
FIG. 3 is a schematic view of another embodiment of an imaging device.

In some embodiments, referring to FIG. 3, the imaging device 10 may include two swivelling modules 11 and the lens module 12. The two swivelling modules 11 are stacked on each other. The lens module 12 includes an emitting module 122 and a receiving module 123.

The emitting module 122 is arranged on a side of one swivelling module 11, and light emitted by the emitting module 122 passes through a corresponding one swivelling module 11 to reach the object. In the embodiment, the emitting module 122 is an infrared laser emitting module.

The receiving module 123 is arranged on a side of the other swivelling module 11 and configured to receive light reflected by the object, the light passes through a corresponding one swivelling module 11. In the embodiment, the receiving module 123 is an infrared laser receiving module.

The emitting module 122 and the receiving module 123 are combined into a depth camera to obtain 3D information of an object, which is required for face recognition and 3D modeling.

Figure 4:
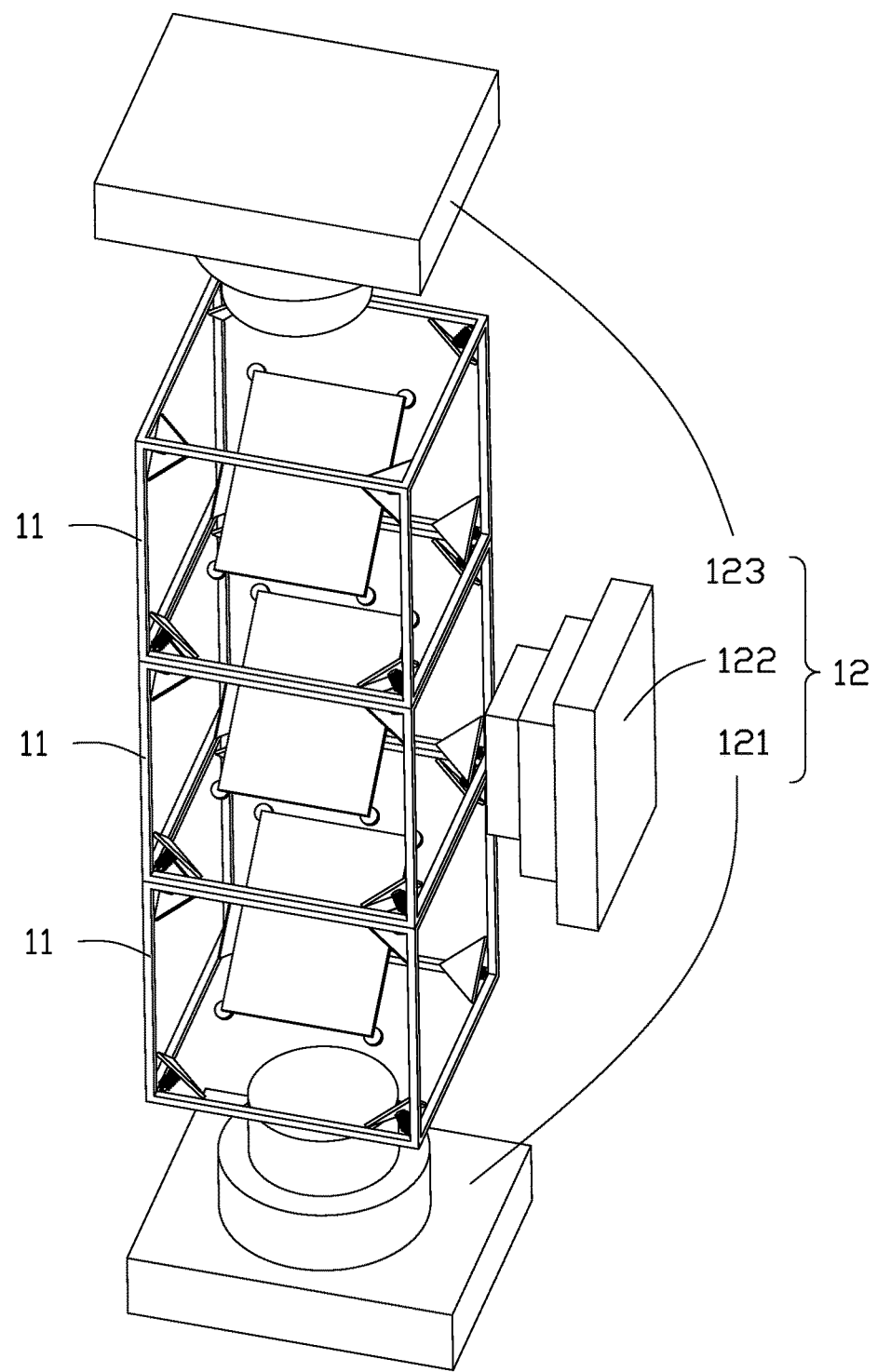
FIG. 4 is a schematic view of yet another embodiment of an imaging device.

In some embodiments, referring to FIG. 4, the imaging device 10 may include three swivelling modules 11 and the lens module 12. The three swivelling modules 11 are stacked. The lens module 12 includes the camera module 121, the emitting module 122, and the receiving module 123. The camera module 121, the emitting module 122, and the receiving module 123 are arranged on sides of the three swivelling modules 11, respectively.

The camera module 121 is configured to receive light from a corresponding one swivelling module 11. Light emitted by the emitting module 122 passes through a corresponding one swivelling module 11 to reach the object. The receiving module 123 is configured to receive light reflected from the object and passing through a corresponding one swivelling module 11. The imaging device 10 in FIG. 4 can not only obtain high-resolution images of objects, but also obtain 3D information of objects.

In the imaging device 10, when the electromagnetic induction coils 114 are energized, the electromagnetic induction coils 114 interact with the magnets 113 to drive the reflecting element 112 to rotate to a required direction. The reflecting element 112 reflects light from such direction to the lens module 12. The imaging device 10 can obtain images captured from different directions. Compared with a front-facing camera and a rear-facing camera, the imaging device 10 takes up less internal space of the electronic device 100. The imaging device 10 is simple to operate, and convenient to use.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A swivelling module comprising:
a light-transmitting housing;
a reflecting element rotatably disposed in the light-transmitting housing and configured to reflect light entering the light-transmitting housing to a lens module;
a plurality of magnets disposed on a periphery of the reflecting element; and
a plurality of electromagnetic induction coils disposed on a plurality of corners of the light-transmitting housing;
wherein when the plurality of electromagnetic induction coils are energized, the plurality of electromagnetic induction coils interact with the plurality of magnets to drive the reflecting element to rotate;
wherein the light-transmitting housing comprises a frame and a plurality of transparent plates respectively disposed on a plurality of lateral surfaces of the frame, the reflecting element is rotatably disposed in the frame.

2. The swivelling module of claim 1, further comprising a plurality of cover plates corresponding one-to-one to the plurality of electromagnetic induction coils and configured to fix the plurality of electromagnetic induction coils at the plurality of corners of the light-transmitting housing.

3. The swivelling module of claim 1, wherein the reflecting element comprises a material of glass or metal, and has a fully reflecting surface.

4. The swivelling module of claim 1, wherein a center of the reflecting element coincides with a center of the light-transmitting housing.

5. An imaging device comprising:
at least one swivelling module, each of the at least one swivelling module comprising:
a light-transmitting housing,
a reflecting element rotatably disposed in the light-transmitting housing and configured to reflect light entering the light-transmitting housing to a lens module,
a plurality of magnets disposed on a periphery of the reflecting element, and
a plurality of electromagnetic induction coils disposed on a plurality of corners of the light-transmitting housing; and
the lens module disposed on a side of the at least one swivelling module and configured to receive light from the at least one swivelling module;
wherein when the plurality of electromagnetic induction coils are energized, the plurality of electromagnetic induction coils interact with the plurality of magnets to drive the reflecting element to rotate;
wherein the light-transmitting housing comprises a frame and a plurality of transparent plates respectively disposed on a plurality of lateral surfaces of the frame, the reflecting element is rotatably disposed in the frame.

6. The imaging device of claim 5, wherein the at least one swivelling module is one, the lens module comprises a camera module disposed on a side of the one swivelling module.

7. The imaging device of claim 5, wherein the at least one swivelling module is two, the two swivelling modules are stacked;
wherein the lens module comprises an emitting module and a receiving module, the emitting module is disposed on a side of one of the two swivelling modules and configured to emit light, the light emitted by the emitting module passes through the one of the two swivelling modules to reach an object; the receiving module is disposed on a side of another one of the two swivelling modules and configured to receive light reflected by the object, the light reflected by the object passes through the another one of the two swivelling modules.

8. The imaging device of claim 5, wherein the at least one swivelling module is three, the three swivelling modules are stacked;

wherein the lens module comprises a camera module, an emitting module, and a receiving module, the camera module, the emitting module, and the receiving module are disposed on sides of the three swivelling modules respectively;

the camera module is configured to receive light from a corresponding one of the three swivelling modules;

the emitting module is configured to emit light, the light emitted by the emitting module passes through a corresponding one of the three swivelling modules to reach an object;

the receiving module is configured to receive light reflected by the object, the light reflected by the object passes through a corresponding one of the three swivelling modules.

9. The imaging device of claim 5, wherein each of the at least one swivelling module further comprises a plurality of cover plates corresponding one-to-one to the plurality of electromagnetic induction coils and configured to fix the plurality of electromagnetic induction coils at the plurality of corners of the light-transmitting housing.

10. The imaging device of claim 5, wherein the reflecting element comprises a material of glass or metal, and has a fully reflecting surface.

11. The imaging device of claim 5, wherein a center of the reflecting element coincides with a center of the light-transmitting housing.

12. An electronic device comprising:
a main body; and
an imaging device disposed on the main body and comprising at least one swivelling module, each of the at least one swivelling module comprising:
a light-transmitting housing,
a reflecting element rotatably disposed in the light-transmitting housing and configured to reflect light entering the light-transmitting housing to a lens module,
a plurality of magnets disposed on a periphery of the reflecting element, and
a plurality of electromagnetic induction coils disposed on a plurality of corners of the light-transmitting housing; and
the lens module disposed on a side of the at least one swivelling module and configured to receive light from the at least one swivelling module;
wherein when the plurality of electromagnetic induction coils are energized, the plurality of electromagnetic induction coils interact with the plurality of magnets to drive the reflecting element to rotate;
wherein the light-transmitting housing comprises a frame and a plurality of transparent plates respectively disposed on a plurality of lateral surfaces of the frame, the reflecting element is rotatably disposed in the frame.

* * * * *